Oct. 19, 1937.    J. WARD    2,096,368
ANIMAL TRAP
Filed Sept. 8, 1936    3 Sheets-Sheet 1
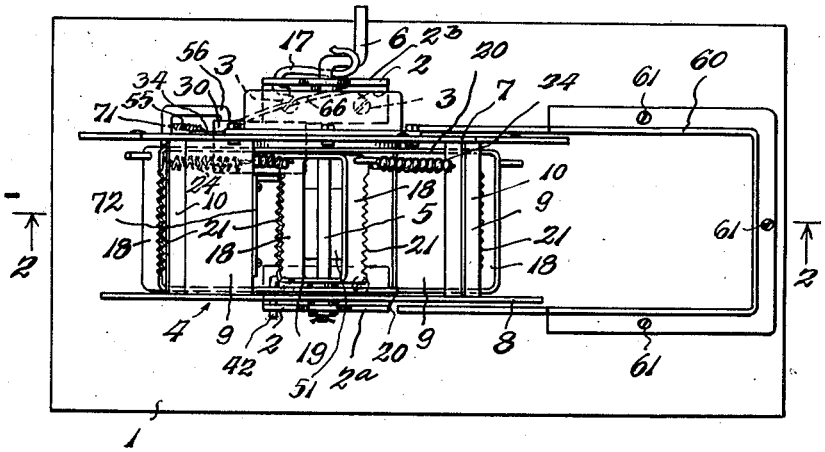
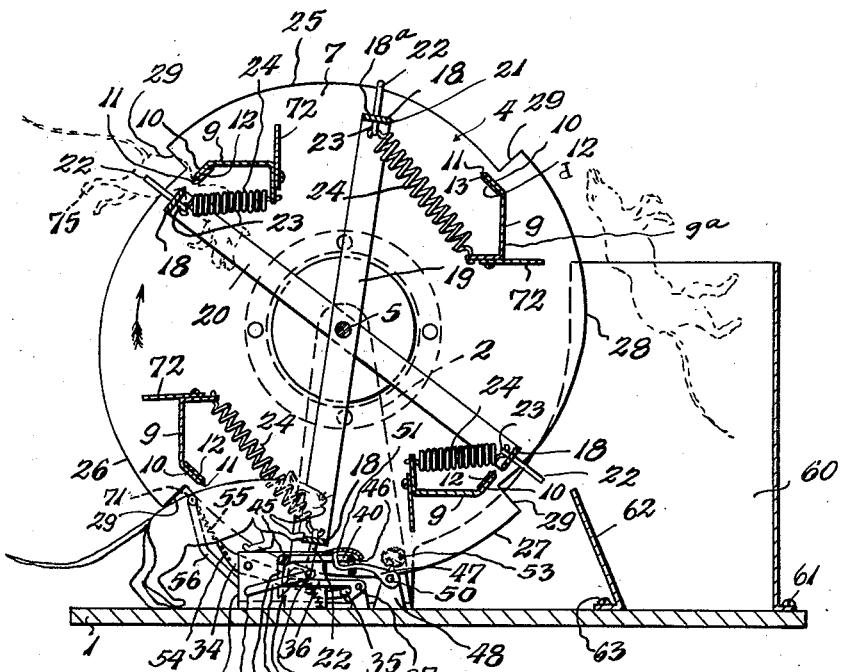
Inventor
JAY WARD.
By Robbs Robb
Attorneys

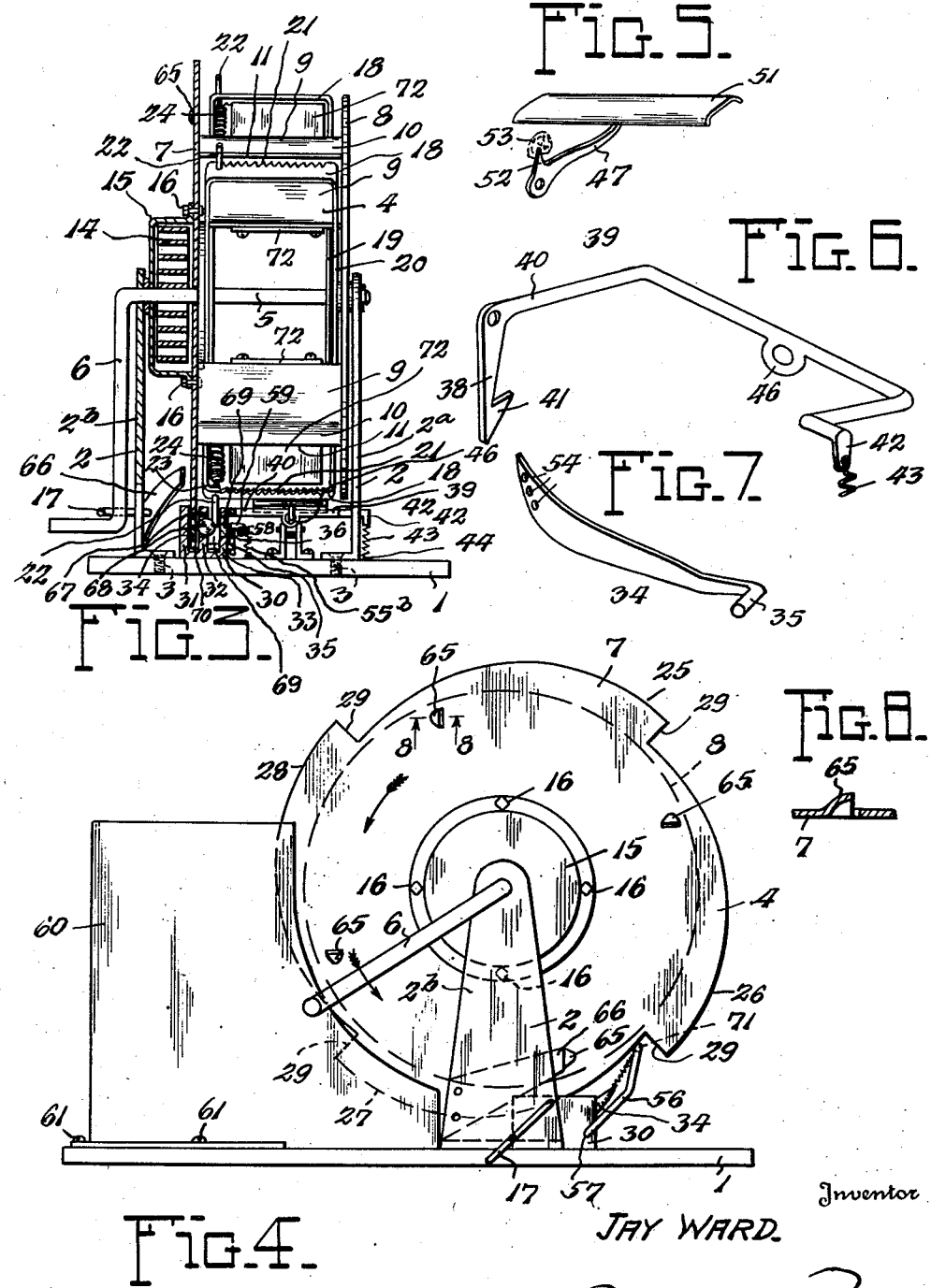

Oct. 19, 1937.  J. WARD  2,096,368

ANIMAL TRAP

Filed Sept. 8, 1936   3 Sheets-Sheet 3

Inventor
JAY WARD.

Patented Oct. 19, 1937

2,096,368

UNITED STATES PATENT OFFICE 2,096,368

ANIMAL TRAP

Jay Ward, Huron, Ohio

Application September 8, 1936, Serial No. 99,828

19 Claims. (Cl. 43—73)

The present invention relates to improvements in animal traps of the revolving type, which comprise instrumentalities for automatically resetting the trap after the same has been operated.

The primary object of the present invention is to provide a trap of the character above referred to, which comprises setting and tripping instrumentalities of a very simple and efficient construction for carrying out the operation of the trap, and which comprises further especially designed jaw members so positioned in regard to the tripping instrumentalities as to assure a quick and safe destruction of animals, eliminating any possibility of escape of the same.

A further object of the present invention consists in the provision of automatic instrumentalities for restoring the setting and tripping instrumentalities of the trap for subsequent operations thereof in a very efficient manner.

A still further object of the present invention is the provision of an animal trap of the rotary type of a construction, wherein the parts of the same are easily accessible and form an open structure to facilitate easy cleaning thereof and to permit admission of an abundance of light so that the animals to be caught therein will more likely enter the same without hesitation.

A further object of the present invention is the provision of a receptacle or container associated with the device of the present invention in such a manner as to receive the carcasses of destroyed animals after the same have been released by the jaws which form a part of the present construction. In this way a more sanitary disposal of the carcasses discharged from the trap is availed of, and the same are no longer visible to other animals approaching the trap.

A still further provision of the device of the present invention is the arrangement of guard members associated with the stationary jaws of the animal trap of the present construction, to facilitate the disposal of the carcasses discharged from the trap into the receptacle above referred to.

Other and further objects of the present invention will become apparent from the following description and drawings, in which:—

Figure 1 represents a top plan view of the animal trap of the present invention.

Figure 2 is a sectional view of the trap construction shown in Figure 1, section being taken on line 2—2 of said figure.

Figure 3 illustrates a front elevation of the device of the present construction, certain parts being shown in section.

Figure 4 is a side elevation of the construction of the present invention.

Figures 5, 6 and 7 are detailed views of parts of the setting and tripping mechanism as employed herein, these details being shown in perspective.

Figure 8 is a sectional detail view of one of the projections of the rotatable cam-disc member.

Figure 9:
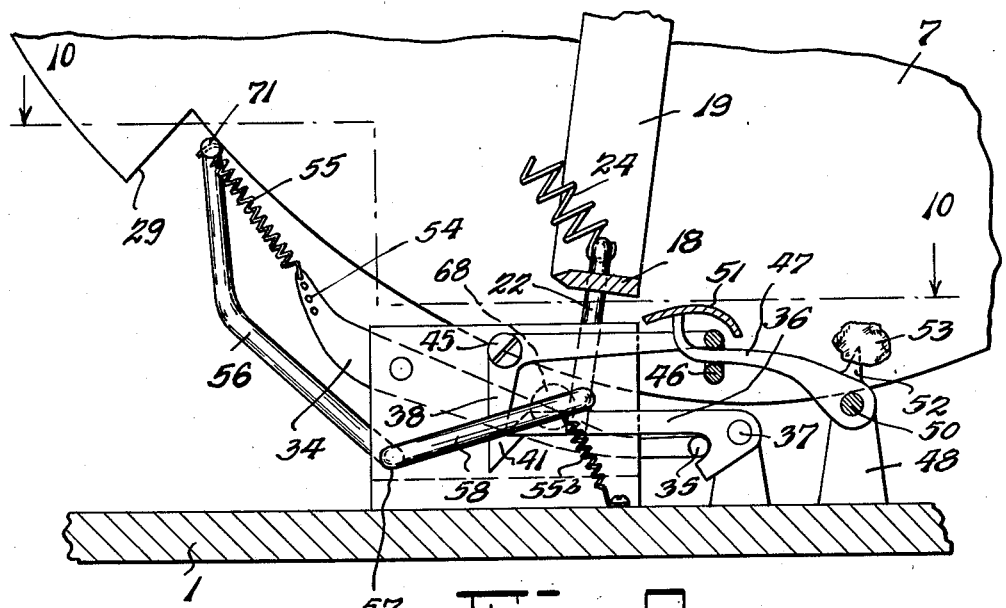
Figure 9 is a detail view of the setting and tripping mechanism, partly in section and partly in elevation, certain parts being omitted.
Figure 10:
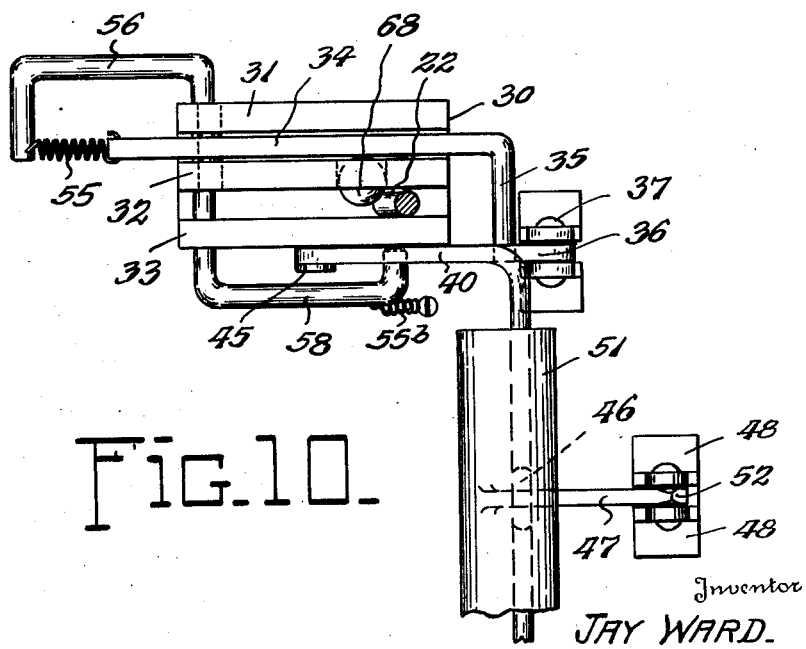
Figure 10 is a top view of the illustration shown in Figure 9, taken on line 10—10, certain parts being omitted.

Referring now to Figures 1 to 4 inclusive, 1 indicates a base member provided with standards 2 secured thereon by means of screws, or any other fastening devices 3. The standards 2 are spaced from each other so as to receive the trap structure generally indicated at 4 therebetween. The trap structure or carrier member 4 is mounted upon a shaft 5 rotatably mounted within the uprights 2 and provided with a crank handle 6. The trap structure 4 consists of a rotatable cam-disc 7 and a rotatable disc 8. The members 7 and 8 are adjacent the uprights 2, rotatably arranged upon the shaft 5.

Interconnecting the rotatable cam-disc 7 and the rotatable disc 8 are fixed or stationary jaw members 9. The stationary or fixed jaw members 9 may be welded or soldered to the discs 7 or 8, or may be attached thereto by any other fastening means. The portions 10 of the stationary jaw members are provided with a sharp edge 11, and a reinforcing member 12 also provided with a sharp edge 13 is connected to each stationary jaw portion 10 to reinforce the latter.

Interposed between the shaft 5 and the rotatable member 7 is a spiral spring 14. One end of the spring is attached to the shaft 5, while the other is connected to the spring casing 15 secured to the cam-disc 7 by means of screws 16. A hook-like member 17 attached to one of the standards 2, adjacent the crank handle 6 of shaft 5, is provided retaining the handle 6 in a position as shown in Figures 1 and 2, after winding of the spring to cause rotation of the trap structure 4, as will be more specifically referred to hereinafter.

The stationary jaws 9 are diametrically opposite each other as will be clearly seen from Figure 2, and while the same have been referred to as being stationary or fixed jaw members, it must be understood, however, that the same are rotatable with the trap structure 4 around the shaft 5.

Arranged for cooperation with the stationary jaw members, and diametrically opposite each other, are movable jaw members 18. These movable jaw members are rotatably arranged upon the shaft 5 by means of arms 19 and 20. These arms 19 and 20 may be preferably integral with the movable jaws 18, the latter being provided with teeth or corrugations at their biting edges 21, which are adapted to cooperate with the sharp edges 11 and portions 10 of the stationary jaws.

The movable jaws carry abutment members 22 arranged for cooperation with certain controlling instrumentalities referred to later on.

Attached to the movable jaw members and the ends 23 of the abutments 22 and interposed between the stationary and movable jaw members are coil springs 24 for urging the movable jaw members into contact with the stationary jaw members 9, when the movable jaw members 18 are released by certain controlling instrumentalities, to which reference will be made as the description proceeds.

The rotatable cam-disc member 7 is provided with a plurality of cam portions 25, 26, 27 and 28, which are separated from each other by diametrically extending portions 29.

Mounted upon the base 1 adjacent the lowermost portion of the rotatable cam-disc member 7 is a supporting member 30 which carries the control instrumentalities of the animal trap of the present invention.

As will be seen from Figure 3, the member 30 comprises three upwardly extending wall portions 31, 32 and 33. The rotatable cam-disc member 7 extends into the space defined by the upwardly extending wall portions 31 and 32 of the member 30.

Movably arranged between the wall portions 31 and 32 of the member 30 is a retaining lever 34 provided at one of its ends with a slightly transverse extending portion 35, as will be best seen from Figures 2 and 7. The portion 35 of the lever 34 cooperates with a lock lever 36, pivotally mounted at 37 upon the base 1. The lock lever 36 cooperates with the downwardly extending portion 38 of the tripping instrumentalities generally indicated at 39. The tripping instrumentalities 39 consist of a somewhat U-shaped trip lever 40 of which the downwardly extending portion 38 is a part. In other words, the portion 38 which is provided with an interlock portion 41 is integral with the trip lever member 40, rotatably carried between the supporting member 30 and the upright 2a.

The other end of lever 40 opposite the portion 38 is supported within the standard 2a and provided with a crank arm portion 42 which engages one end of a spring 43, the other end of which is secured to the base 1 at 44. The spring 44 is primarily adapted to balance the weight of the lever 40, which is pivotally secured to support 30 at 45. The lever 40 is further provided with a loop portion 46 thru which a trip actuating lever 47 extends, as clearly seen from Figure 2. The trip actuating lever 47 is pivotally mounted on the base 1 by means of an upright 48 as clearly seen at 50 in Figure 2.

The trip actuating lever 47 is further provided with a platform or cross bar member 51, and an upwardly extending pointed portion 52, adapted to carry a bait 53.

The retaining lever 34 is provided at its front end with several openings 54 adapted to be engaged by a coil spring 55, secured with its other end to resetting lever 56, which is rotatably arranged within the member 30, as shown at 57 and provided with an arm 58 and transverse portion 59, extending between the lock lever 36 and trip lever 40.

In close proximity to the rear of the trap structure 4 is a container or receptacle 60, which is secured to the base 1 by means of fastening instrumentalities 61. The bottom of the receptacle 60 is formed by the base 1, and the front wall thereof, as shown at 62, is formed by a separate wall member attached to the base 1 by means of screws 63.

The rotatable cam-disc 7 is provided with outwardly bent projections 65 as clearly seen from Figures 4 and 8, cooperating with a leaf spring 66 to prevent backward rotation of member 7 when the trap is conditioned for operation. The leaf spring is connected to the standard 2b and contacts slightly with its free end against the member 7 so as to abut with the portions 65 in a manner as will be specifically described later on.

The wall 32 of the member 30 is provided with a hole 67 within which a ball or shiftable member 68 is arranged. An opening 69 somewhat larger than the ball 68 within the upwardly extending wall 33 of the member 30 and normally closed by a threaded plug is provided to permit the insertion of the ball 68 in its place. The ball 68 is arranged within the member 30 in such a manner that when the lever 34 holds the same in a position as shown in Figure 3, it will extend into the compartment 69 of the member 30 and prevent the passage of any one of the abutment members 22, until certain instrumentalities are operated, and the ball 38 is permitted to move out of the compartment 69 and to partially enter the compartment 70.

The cam portions 25, 26, 27 and 28 of the member 7 are successively in close proximity of the ball or shiftable retaining member 68, in view of the fact that they extend into the compartment 70 of the member 30, so that upon rotation of the disc 7, any of these cam members, which is at that time opposite the ball 68, will exert a shifting action upon the ball, and force the same into the compartment 69, as seen in Figure 3, in which position the ball is then held by the retaining lever 34 which has now moved upwardly into the position as shown in Figure 3 by the shifting action of such cam portions 25 to 28 inclusive, as may be in cooperation therewith at such time.

The resetting lever 56 is provided with a portion 71, which extends transversely with respect to the member 7, and is adapted to engage the cam portions thereof.

The stationary jaw members 9 are provided with guard plates 72, which prevent the carcasses discharged from the trap of the present invention from falling within the structure of the device and interfering with the proper operation thereof. The guard plates 72 facilitate further, the disposal of the carcasses within the container or compartment 60.

The operation of the device is as follows:—

The retaining member 17 is disconnected from the crank handle 6, the latter is rotated in a counterclockwise direction, and the spring 14 is thereby tensioned. The handle 6 is now locked in its downward position by means of the retaining member 17. This locks also the shaft 5 against rotation. The spring 14 interposed between the shaft 5 and the member 7 will now rotate the carrier member 4 and one of the cam portions of the disc 7 adjacent the ball 68 will engage the same and force the same toward the compartment 69. The cam portion actuating the ball 68 is at that time also contacting with the retaining lever 34 at the forward end of the latter, and the lever 34 is thereby moved downwardly with its front end. The lever 34 will reach its lowermost position before the portion 29 at the end of the respective cam portion of the disc 7 has passed the lever 34. The rear portion of lever 34 is now directly in front of the opening 67, and retains the ball or shiftable retaining member in a position as shown in Figure 3.

Such upward movement of the retaining lever 34 which engages with its portion 35, the lock lever 36, will move the latter upwardly to interengage with the portion 41 of the trip lever 40. The trip lever 40 has been previously raised to the position as shown in Figure 3 by means of the resetting lever 56, the end 71 of which has been pressed downwardly by the respective cam portion of the disc 7 cooperating with the same at that time, while the upward movement of the portion 58 of the lever 56 caused the raising of the trip lever 40 and trip actuating lever 47, so that the part 41 engages now the lock lever 36, which is raised in the manner as previously described.

The lever 36 is locked in its position as shown in Figure 2, and the setting and tripping instrumentalities are now conditioned for operation.

During the operation of the parts as described hereinbefore, the rotation of the disc 7 causes rotation also of the stationary and movable jaw members 9 and 18 respectively. The abutment 22 of one of the movable jaw members 18 which at that time is adjacent the ball 68 will be held back against the tension of its spring 24, and likewise, the movable jaw member diametrically disposed of the same and mounted upon the same supporting structure 19 will be held back against rotation, and the coil spring associated with the latter will also be tensioned. Therefore, it will be seen with the parts now as shown in Figure 2 that the lowermost movable jaw member 18 has been moved away from the stationary jaw member 9 and an opening is thereby provided thru which an animal may have access to the bait 53.

The rotation of the unit 4 continues against the force of springs 24 until the same balances with the force of the spring 14. The animal is thereby compelled to enter the trap between one of the stationary jaws and the movable jaw held under tension by spring 24, and as soon as it touches the trip actuating or release lever 47, the same moves downwardly causing a corresponding movement of the trip lever 40, and the portion 41 will be disengaged from the lock lever 36. The latter drops down and releases the retaining lever 34, which also moves downwardly on account of its own weight, and releases the ball 68 which now enters the compartment 70, thereby moving out of the way of the abutment member 22 on the movable jaw 18 now under tension; whereupon, the movable jaw will rapidly move toward the stationary jaw 9 with which it cooperates, and the animal will be caught between the sharp edges of the jaws and will be immediately destroyed.

It must be noted that before the movable jaw 18 moves to its closed position the animal must enter the trap far enough to touch the portion 51 of the trip actuating lever and will, therefore, be caught between the jaws behind its front legs so that escape is impossible. Immediately upon the completion of the cycle of operation, just described, and coincident with the movement of the movable jaw 18, just referred to, the unit 4 will again rotate to condition the trap for a subsequent operation, in the same manner as previously described. Now the next movable jaw will be conditioned to operative position while the movable and stationary jaws between which the animal has just been caught move upwardly with the same and the animal is now held in position as shown at 75 in Figure 2.

In this manner, animals entering the trap may be caught in successive operation and moved upwardly during the rotation of the apparatus as hereinbefore mentioned.

It has also to be noted that the movable jaw diametrically opposite to the movable jaw conditioned for operation will be opened. This happens when the destroyed animals have passed their uppermost point of elevation during rotation of the trap. The movement of the movable jaw 18a, for instance, to its open position is suddenly initiated while the stationary jaw 9a, for instance, continues somewhat its rotation. The carcass of the destroyed animal will, therefore, be discharged from the device, and will fall into the compartment 60, from where it may be later removed. The guard plates 72 on the stationary jaws 9, as previously mentioned, prevent the carcass from dropping between the operating instrumentalities of the trap, and may eventually apply a kick to the carcass to be disposed of to throw the same farther away from the trap structure and into the compartment 60. In this way, the device may operate in succession without any attendants. It is only necessary from time to time, to rewind the spring 14.

When the mechanism is in its set position, one of the projections 65 is engaged by the leaf spring 66, and a backward rotation of the rotatable cam disc is eliminated. Such backward rotation or reaction upon the disc 7 is caused by the tensioning of the springs 24. In other words, when the backward rotation of the member 7 would not be prevented at a point where the tension of the springs 24 has reached the same force as the tension of the spring 14, the parts of the mechanism may be rendered inoperative, or the resetting lever 56 will be subjected to undue strain.

It has to be further noted that when the shiftable retaining member 68 is moved out of the way of one of the abutment members 22 during tripping action of the device, a short interval of time will elapse before it is engaged by one of the succeeding cam portions 25 to 28 inclusive, so that a complete release of one of the abutments 22, with which the shiftable member was in cooperation before the tripping action, is assured.

The springs 55 and 55b hold the resetting lever 56 in contact with the cam portions of the rotatable member 7.

The animal trap of the present invention is especially adaptable for the destruction of small animals such as mice, rats or like pests and in view of its sturdy construction it will not be liable to break or get out of order.

Having thus described my invention, what I claim as new and desire to secure by Letters Patent of the United States, is:—

1. A device of the character described, comprising, in combination, a rotatable member, cam portions on said rotatable member, stationary jaw members on said rotatable member, movable jaw members cooperating with the stationary jaw members, controlling instrumentalities for rendering the movable jaw members operative for cooperation with the stationary jaw members, said controlling instrumentalities comprising parts cooperating with said cam portions, and means for tripping said controlling instrumentalities to effect operation of the movable jaw members.

2. In a device of the character described, comprising, in combination, a base, a shaft, means for supporting said shaft upon the base, a rotatable member carried by said shaft, cam portions on said rotatable member, resilient means between said shaft and rotatable member for rotating the latter, stationary jaws on said rotatable member, movable jaws on said shaft and cooperating with said stationary jaws, resilient means between said stationary and movable jaws, abutment instrumentalities on said movable jaws, and means for controlling the operation of the movable jaws cooperating with the said abutment instrumentalities and cam portions.

3. A device of the character described, comprising, in combination, a plurality of rotatable disc members, stationary jaw members carried by said disc members, movable jaw members cooperating with said stationary jaw members, means for setting the jaw members into operative position, and cam portions on one of said rotatable disc members for initiating the operation of said setting means.

4. A device of the character described, comprising, in combination, a base, a shaft carried by said base, a plurality of disc members rotatably arranged upon said shaft means for rotating said disc member, stationary jaw members interconnecting said disc members, guard portions on the stationary jaw members, movable jaw members mounted on the shaft and cooperating with said stationary jaw members, means for controlling the operation of the movable jaw members, and cam members upon one of said disc members for initiating the operation of the controlling instrumentalities upon rotation of said disc members.

5. An animal trap of the character described, comprising, in combination, a carrier member, a plurality of cooperating jaws thereon, means for rotating said carrier member and jaws to bring said jaw members in successive operative positions, abutment members on certain of said jaw members, a ball-like retaining member cooperating with said abutment members for effecting opening of the jaw members, means for controlling the operation of the ball-like retaining member, and instrumentalities for releasing the retaining member thereby closing said jaw members.

6. An animal trap of the character described, comprising, in combination, a rotatable carrier member, a plurality of cooperating jaws thereon, means for rotating said carrier member and jaws to bring said jaw members in successive operative position, abutment members on certain of said jaw members, a ball-like retaining member cooperating with said abutment members, for effecting opening of the jaw members, means for controlling the operation of the ball-like retaining member including a plurality of cam portions on said carrier member, and instrumentalities for releasing the retaining member thereby closing said jaw members.

7. A device of the character described, comprising, in combination, a rotatable member, cam portions on the rotatable member, stationary jaw members on the rotatable member, movable jaw members cooperating with said stationary jaw members, controlling means for causing opening and closing of cooperating jaw members, abutment members on said movable jaw members cooperating with said controlling means, said controlling means comprising a ball member cooperating with said cam portions and abutment members for conditioning of the movable jaw members for operation, a ball retaining lever, and trip means for said ball retaining lever for causing tripping of the movable jaw members.

8. A device of the character described, comprising, in combination, a rotatable member, cam portions on the rotatable member, stationary jaw members on the rotatable member, movable jaw members cooperating with said stationary jaw members, resilient means for urging the movable jaw members toward said stationary jaw members, controlling means for causing opening and closing of cooperating jaw members, abutment members on said movable jaw members cooperating with said controlling means, said controlling means comprising a ball member, cooperating with said cam portions and abutment members for conditioning of the movable jaw members for operation, a ball retaining lever, and trip means for said ball retaining lever for causing tripping of the movable jaw members.

9. An animal trap of the character described, comprising, in combination, a carrier member, a plurality of cooperating jaws thereon, means for rotating said carrier member and jaws to bring said jaw members in successive operative positions, abutment members on certain of said jaw members, a ball-like retaining member cooperating with said abutment members for effecting opening of the jaw members in their respective operative positions, means for controlling the operation of the ball-like retaining member, instrumentalities for releasing the retaining member thereby closing said jaw members, and guard means associated with certain of the jaw members.

10. A device of the character described, comprising, in combination, a rotatable unit, a shaft for supporting said unit, means for rotating the rotatable unit, a series of cooperating jaws on said shaft and unit, resilient means between cooperating jaws for urging the same toward each other, abutment members on certain of said jaws, ball-like retaining means for engaging said abutment members and for holding the same and their associated jaw members against the rotation of the rotatable unit to thereby tension said resilient means and condition cooperating jaws for trapping operation, a retaining lever for holding said ball-like means in engagement with at least one of said abutment members, a trip lever, a lock lever interlocking said trip lever and retaining lever, and a trip actuating lever for effecting release of said lock lever to produce a corresponding release of said retaining lever and ball-like member for tripping cooperating conditioned jaws for performing trapping operation thereof.

11. A device of the character described, comprising, in combination, a rotatable unit, a shaft for supporting said unit, means for rotating the rotatable unit, a series of cooperating jaws on said shaft and unit, resilient means between cooperating jaws for urging the same toward each other, abutment members on certain of said jaws, ball-like retaining means for engaging said abutment members and for holding the same and their associated jaw members against the rotation of the rotatable unit to thereby tension said resilient means and condition cooperating jaws for trapping operation, a retaining lever for holding said ball-like means in engagement with at least one of said abutment members, a trip lever, a lock lever interlocking said trip lever and retaining lever, a trip actuating lever for effecting release of said lock lever to produce a corresponding release of said retaining lever and ball-like member for tripping cooperating conditioned jaws for performing trapping operation thereof, and means for resetting said retaining lever, lock lever and trip lever to condition cooperating jaws for successive operation.

12. A device of the character described, comprising, in combination, a rotatable unit, a shaft for supporting said unit, means for rotating the rotatable unit, a series of cooperating jaws on said shaft and unit, resilient means between cooperating jaws for urging the same toward each other, abutment members on certain of said jaws, ball-like retaining means for engaging said abutment members and for holding the same and their associated jaw members against the rotation of the rotatable unit to thereby tension said resilient means and condition cooperating jaws for trapping operation, a retaining lever for holding said ball-like means in engagement with at least one of said abutment members, a trip lever, a lock lever interlocking said trip lever and retaining lever, a trip actuating lever for effecting release of said lock lever to produce a corresponding release of said retaining lever and ball-like member for tripping cooperating and conditioned jaws for performing trapping operation thereof, and means for resetting said retaining lever, lock lever and trip lever to condition cooperating jaws for successive operation, said means including cam members on said rotatable unit cooperating with said ball-like member.

13. A device of the character described, comprising, in combination, a rotatable unit, a shaft for supporting said unit, means for rotating the rotatable unit, a series of cooperating jaws on said shaft and unit, resilient means between cooperating jaws for urging the same toward each other, abutment members on certain of said jaws, ball-like retaining means for engaging said abutment members and for holding the same and their associated jaw members against the rotation of the rotatable unit to thereby tension said resilient means and condition operating jaws for trapping operation, a retaining lever for holding said ball-like means in engagement with at least one of said abutment members, a trip lever, a lock lever interlocking said trip lever and retaining lever, a trip actuating lever for effecting release of said lock lever to produce a corresponding release of said retaining lever and ball-like member for tripping cooperating conditioned jaws for performing trapping operation thereof, means for resetting said retaining lever, lock lever and trip lever to condition cooperating jaws for successive operation, and means for controlling the rotation of said rotatable unit.

14. A device of the character described, comprising, in combination, a rotatable unit, a shaft for supporting said rotatable unit, means for rotating said unit, stationary jaws on said unit, movable jaws on said shaft and cooperating with said stationary jaws to perform trapping functions, resilient means for urging the movable jaws toward said stationary jaws, abutment members on said movable jaws, shiftable retaining means for engaging said abutment members for holding the same and the movable jaws against the rotation of the rotatable unit and away from the stationary jaws to thereby tension said resilient means and condition cooperating jaws for trapping operation, a retaining lever for holding said shiftable retaining means in engagement with said abutment members, a trip lever, a lock lever interlocking said trip lever and retaining lever for holding cooperating jaws in conditioned position, and a trip actuating lever for releasing said lock lever, retaining lever and shiftable member to thereby effect the tripping of conditioned jaws for performing trapping operation.

15. A device of the character described, comprising, in combination, a rotatable unit, a shaft for supporting said rotatable unit, means for rotating said unit, stationary jaws on said unit, movable jaws on said shaft and cooperating with said stationary jaws to perform trapping functions, resilient means for urging the movable jaws toward said stationary jaws, abutment members on said movable jaws, shiftable retaining means for engaging said abutment members for holding the same and the movable jaws against the rotation of the rotatable unit and away from the stationary jaws to thereby tension said resilient means and condition cooperating jaws for trapping operation, a retaining lever for holding said shiftable retaining means in engagement with said abutment members, a trip lever, a lock lever interlocking said trip lever and retaining lever for holding cooperating jaws in conditioned position, a trip actuating lever for releasing said lock lever, retaining lever and shiftable member to thereby effect the tripping of conditioned jaws for performing trapping operation, and cam members on said rotatable unit for initiating the operation of the shiftable member and retaining lever upon rotation of said unit.

16. A device of the character described, comprising, in combination, a rotatable unit, a shaft for supporting said rotatable unit, means for rotating said unit, stationary jaws on said unit, movable jaws on said shaft and cooperating with said stationary jaws to perform trapping functions, resilient means for urging the movable jaws toward said stationary jaws, abutment members on said movable jaws, shiftable retaining means for engaging said abutment members for holding the same and the movable jaws against the rotation of the rotatable unit and away from the stationary jaws to thereby tension said resilient means and condition cooperating jaws for trapping operation, a retaining lever for holding said shiftable retaining means in engagement with said abutment members, a trip lever, a lock lever interlocking said trip lever and retaining lever for holding cooperating jaws in conditioned position, a trip actuating lever for releasing said lock lever, retaining lever and shiftable member to thereby effect the tripping of conditioned jaws for performing trapping operation, cam members on said rotatable unit for initiating the operation of the shiftable member and retaining lever upon rotation of said unit, and resetting means for said trip lever cooperating with said cam members and retaining lever.

17. A device of the character described, comprising, in combination, a rotatable unit, a shaft for supporting said rotatable unit, means for rotating said unit, stationary jaws on said unit, guard members on said stationary jaws, movable jaws on said shaft and cooperating with said stationary jaws to perform trapping functions, resilient means for urging the movable jaws toward said stationary jaws, abutment members on said movable jaws, shiftable retaining means for engaging said abutment members for holding the same and the movable jaws against the rotation of the rotatable unit and away from the stationary jaws to thereby tension said resilient means and condition cooperating jaws for trapping operation, a retaining lever for holding said shiftable retaining means in engagement with said abutment members, a trip lever, a lock lever, interlocking said trip lever and retaining lever for holding cooperating jaws in conditioned position, and a trip actuating lever for releasing said lock lever, retaining lever and shiftable member to thereby effect the tripping of conditioned jaws for performing trapping operation.

18. A device of the character described, comprising, in combination, a rotatable member, cam portions on said rotatable member, stationary jaw members on said rotatable member, guard members on said stationary jaw members, movable jaw members cooperating with the stationary jaw members, controlling instrumentalities for rendering the movable jaw members operative for cooperation with the stationary jaw members, said controlling instrumentalities comprising parts cooperating with said cam portions, and means for tripping said controlling instrumentalities to effect operation of the movable jaw members.

19. A device of the character described, comprising, in combination, a rotatable member, means for rotating said rotatable member, cam portions on said rotatable member, stationary jaw members on said rotatable member, guard members on said stationary jaw members, movable jaw members cooperating with the stationary jaw members, controlling instrumentalities for rendering the movable jaw members operative for cooperation with the stationary jaw members, said controlling instrumentalities comprising parts cooperating with said cam portions, means for tripping said controlling instrumentalities to effect operation of the movable jaw members, and means for preventing backward rotation of the rotatable member.

JAY WARD.